(No Model.)
W. H. SHAY.
VALVE.
No. 604,846. Patented May 31, 1898.
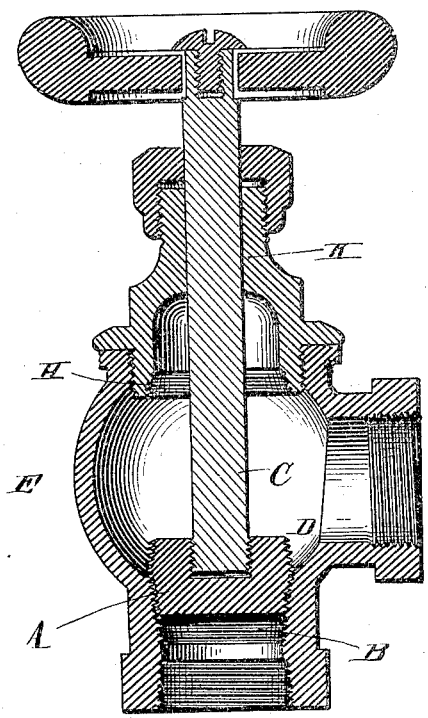
Witnesses:
William L. Clark
[signature]
Inventor:
William Henry Shay

UNITED STATES PATENT OFFICE.

WILLIAM HENRY SHAY, OF NEWBURG, NEW YORK, ASSIGNOR OF ONE-HALF TO BENJAMIN FRANKLIN SHAY, OF POUGHKEEPSIE, NEW YORK.

VALVE.

SPECIFICATION forming part of Letters Patent No. 604,846, dated May 31, 1898.

Application filed January 5, 1897. Serial No. 618,094. (No model.)

*To all whom it may concern:*

Be it known that I, WILLIAM HENRY SHAY, a citizen of the United States, residing at Newburg, in the county of Orange and State of New York, have invented a new and useful Valve for Steam, Water, Gas, &c., of which the following is a specification.

The object of this invention is to overcome certain defects that exist in globe and angle valves as usually made by providing a method of construction that avoids the injury to the valve by the strain caused by changes in the length of valve-stem produced by the different temperatures to which the valve is subjected and provide a method of construction of seat and plug of valve that if any foreign matter should find lodgment on either seat or plug of valve the peculiar way that seat and plug are formed will assist to clear either seat or plug of any matter lodged thereon; also, to provide a construction by which the valve may readily be changed into an elbow, and is for that reason adapted to valves of the angle type. I attain these objects in the manner shown in the accompanying drawing, which represents a vertical sectional view.

Letters are used to denote the several parts. The body of the valve E has a seat B, in which is cut a taper screw-thread. The plug A, which fits seat B, also has a taper screw-thread. The screw-thread on both seat B and plug A are cut with a matched tap and die, which may be fitted by grinding. This insures a perfect fit of seat B with plug A.

The valve-stem C is firmly secured to plug A. The valve-stem C is cylindrical in form and passes through valve-top K, also of cylindrical form. Stem C and valve-top K are fitted so that stem C will turn and slide, or so that stem C will move by hand or by expansion and contraction. The seat B, plug A, stem C, and valve-top K are all centrally in alinement. The lower part of valve-top K has a screw-thread at H. The plug A has a screw-thread at D. The threads H and D engage each other when valve-stem C is raised and holds stem C in position.

A valve made according to the foregoing detailed description has many advantages over other methods of construction. Valves as now constructed have the valve-stem confined at both ends and changes in the length of the stem will either cause a leak or strain seat of valve. When the valve is closed, the plug is pressed tight on seat. Thus the stem is confined at both ends. The stem is then at the temperature of the valve. If after valve is closed the temperature of stem should fall, it will become shorter in length and pull plug from the valve-seat, causing a leak. When the conditions are reversed as to temperature, the plug will be forced onto the seat and is apt when repeated several times to strain the valve, rendering it unfit for further use. My invention corrects this defect, as shown from the detailed description. The valve-stem being free to move, the seat is under no strain and if tight when closed will remain so until open, changes of temperature having no effect whatever.

Very little force is required to open and close this valve. The screw-thread being cut from perfectly-matched taps and dies a fit is obtained with a small force, and the screws will clear plug or seat of any matter that has lodged on either of them.

The valve as described above is peculiarly adapted to use on a hot-water heating system where it is necessary to provide a plan to shut off a fixture for repairs and leave the rest ready for use. For this purpose I make the valve of cast-iron of the angle type, using it in place of elbows, placing two on each radiator in the cellar, and, if desired, they can be used on the main pipes. Where used for this purpose, I have a hole drilled in side of valve and fit a small cock to it, so that the part of the system that is closed can be drained of its water. The repairs can then be made and the rest of the plant used in the usual way. The valve-stem being free from screw-threads when the valve is opened, the plug is entirely free from any part of the valve except the stem. The stem with plug can then be raised to threaded recess in top of valve, giving as much free space for water as an elbow.

I am aware that valves having screw-threaded seats and plugs have been made and do not claim that feature, but believe that the combination described herein for the purpose specified to be new.

What I desire to secure by Letters Patent is—

In an angle-valve of the character specified, comprising the casing having inlet and outlet openings, and a valve-seat placed at the opening of greatest depth, a valve-stem having at the lower end a valve formed by joining the larger ends of the frustums of two cones, said valve having each end screw-threaded, the lower end of valve being adapted to fit a screw-threaded socket in the valve-seat when shut, and when open the upper end of valve to fit the screw-threaded recess in the bonnet or top of casing, as shown and described.

WILLIAM HENRY SHAY.

Witnesses:
 ISAAC B. LOZIER,
 WM. H. DANIELS.